(12) United States Patent
Suzuki (10) Patent No.: US 9,544,546 B2
(45) Date of Patent: Jan. 10, 2017

(54) CRUISING LANE RECOGNITION IN A TUNNEL

(75) Inventor: Shunsuke Suzuki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 208 days.

(21) Appl. No.: 14/233,095

(22) PCT Filed: Jul. 13, 2012

(86) PCT No.: PCT/JP2012/067966
§ 371 (c)(1),
(2), (4) Date: Jan. 15, 2014

(87) PCT Pub. No.: WO2013/011952
PCT Pub. Date: Jan. 24, 2013

(65) Prior Publication Data
US 2014/0152829 A1    Jun. 5, 2014

(30) Foreign Application Priority Data
Jul. 20, 2011    (JP) .................................. 2011-159101

(51) Int. Cl.
*H04N 7/18*    (2006.01)
*G08G 1/16*    (2006.01)
*G06K 9/00*    (2006.01)

(52) U.S. Cl.
CPC .......... *H04N 7/181* (2013.01); *G06K 9/00798* (2013.01); *G06K 9/00825* (2013.01); *G08G 1/167* (2013.01)

(58) Field of Classification Search
CPC    H04N 7/181; G06K 9/00798; G06K 9/00825; G08G 1/167
See application file for complete search history.

(56) References Cited

U.S. PATENT DOCUMENTS

| | | | | |
|---|---|---|---|---|
| 2002/0056806 A1* | 5/2002 | Bechtel | ................... | B60R 1/088 250/214.1 |
| 2003/0023432 A1* | 1/2003 | Kyomitsu | ............... | G10L 15/20 704/231 |

(Continued)

FOREIGN PATENT DOCUMENTS

| | | |
|---|---|---|
| JP | H10-49672 A | 2/1998 |
| JP | 3227248 B2 | 11/2001 |

(Continued)

OTHER PUBLICATIONS

PCT International Preliminary Report on Patentability in corresponding PCT Application No. PCT/JP2012/067966.

(Continued)

*Primary Examiner* — Jay Patel
*Assistant Examiner* — Joseph Suh
(74) *Attorney, Agent, or Firm* — Harness, Dickey & Pierce, P.L.C.

(57) ABSTRACT

A cruising lane recognition device is mounted on a vehicle. The device includes a camera, a storing unit, and a processor. The camera captures an image of an area including the road ahead of the vehicle. The processor is configured to detect luminances within the images, recognize a cruising lane-marker of the road in the images on the basis of the luminances which are detected, a store, in the storing unit, a position of the cruising lane-marker that is recognized, detect that the vehicle is in a tunnel, and set a virtual cruising lane-marker on the basis of an archival record of the position of a cruising lane-marker which has been stored in the storing unit when the cruising lane-marker cannot be recognized and the vehicle has been detected to exist in a tunnel.

9 Claims, 7 Drawing Sheets

(56) References Cited

U.S. PATENT DOCUMENTS

| | | | |
|---|---|---|---|
| 2003/0069695 A1* | 4/2003 | Imanishi | B60R 1/00 701/301 |
| 2004/0102884 A1 | 5/2004 | Tange et al. | |
| 2004/0113053 A1* | 6/2004 | Michenfelder | B60Q 1/1423 250/214 R |
| 2005/0265579 A1* | 12/2005 | Nishida | G06K 9/00798 382/103 |
| 2006/0087453 A1* | 4/2006 | Iwane | G01C 21/26 340/988 |
| 2006/0159309 A1 | 7/2006 | Tsukamoto | |
| 2006/0239509 A1* | 10/2006 | Saito | G06K 9/6205 382/104 |
| 2007/0027572 A1* | 2/2007 | Koyama | G01S 19/49 700/211 |
| 2007/0100551 A1* | 5/2007 | Ishikura | B60T 8/17551 701/301 |
| 2007/0185643 A1* | 8/2007 | Yamane | G01C 21/34 701/117 |
| 2008/0197656 A1* | 8/2008 | Fujimoto | B60J 1/02 296/84.1 |
| 2009/0028389 A1* | 1/2009 | Edanami | G06K 9/468 382/104 |
| 2009/0041303 A1* | 2/2009 | Aoki | G06K 9/00798 382/104 |
| 2009/0088966 A1* | 4/2009 | Yokoyama | B62D 15/025 701/533 |
| 2009/0118994 A1* | 5/2009 | Mori | G06K 9/00798 701/117 |
| 2010/0228437 A1* | 9/2010 | Hanzawa | B62D 15/025 701/41 |
| 2010/0238283 A1* | 9/2010 | Kim | G06T 7/0042 348/135 |
| 2011/0066372 A1* | 3/2011 | Sakashita | G01C 21/165 701/532 |
| 2011/0301813 A1* | 12/2011 | Sun | B62D 15/029 701/41 |
| 2012/0035844 A1* | 2/2012 | Ono | B60W 30/12 701/300 |
| 2012/0050074 A1* | 3/2012 | Bechtel | B60R 1/04 340/988 |
| 2013/0158865 A1* | 6/2013 | Na | G01C 21/005 701/448 |
| 2015/0210312 A1* | 7/2015 | Stein | B60W 30/00 701/41 |

FOREIGN PATENT DOCUMENTS

| | | |
|---|---|---|
| JP | 2003-205805 A | 7/2003 |
| JP | 2004-145852 | 5/2004 |
| JP | 3606276 B2 | 1/2005 |
| JP | 3612970 B2 | 1/2005 |
| JP | 2006-011656 | 1/2006 |
| JP | 2006-331389 A | 12/2006 |
| JP | 2009-122744 A | 6/2009 |
| JP | 2010-036757 | 2/2010 |
| JP | 4496964 B2 | 7/2010 |
| JP | 2010-218528 A | 9/2010 |
| JP | 2011-150689 A | 8/2011 |
| KR | 2010-0104495 | 9/2010 |
| WO | WO-2011/078300 A1 | 6/2011 |

OTHER PUBLICATIONS

Office Action dated Apr. 27, 2015 in corresponding Korean Application No. 10-2014-7001431.

Office Action dated May 13, 2014 in corresponding Japanese Application No. 2011-159101.

International Search Report and Written Opinion of the ISA for PCT/JP2012/067966, ISA/JP, mailed Aug. 14, 2012.

* cited by examiner

CRUISING LANE RECOGNITION IN A TUNNEL

CROSS-REFERENCE TO RELATED APPLICATIONS

This application is a 371 U.S. National Stage of International Application No. PCT/JP2012/067966, filed Jul. 13, 2012. This application claims priority to Japanese Patent Application No. 2011-159101, filed Jul. 20, 2011. The disclosures of the above applications are incorporated herein by reference.

TECHNICAL FIELD

The present invention relates to a cruising lane recognition device that recognizes a cruising lane marker drawn on a road.

BACKGROUND ART

Conventionally, a cruising lane recognition device is known that captures an image of an area including the road ahead of a vehicle, and recognizes a cruising lane marker (such as a white lane marker) on the road based on the changes in luminances within the image (see Patent Document 1). The cruising lane recognition device can, for example, be used in an on-board system that issues a warning that the vehicle will deviate from the cruising lane. In other words, the cruising lane recognized by the cruising lane recognition device and a cruising trajectory of the vehicle predicted based on a yaw sensor or a speed sensor can be analyzed, and the risk of cruising lane deviation can be judged.

PRIOR ART DOCUMENTS

Patent Documents

[PATENT DOCUMENT 1] Japanese registered patent No. 3606276

SUMMARY OF THE INVENTION

Subject to be Solved by the Invention

Because the cruising lane marker is low contrast in a tunnel or the like, the cruising lane marker cannot be recognized from the captured image in some instances. In addition, because of sudden changes in brightness accompanying entry into and exit from the tunnel, the difference in luminance between the cruising lane marker and other areas in the image captured by a camera decreases, and the cruising lane marker cannot be recognized in some instances.

The present invention has been achieved in light of the above-described issues. An object of the present invention is to provide a cruising lane recognition device capable of setting a virtual cruising lane marker even when a cruising lane marker cannot be recognized.

Means for Solving Subject

A cruising lane recognition device of an exemplary embodiment captures an image of an area including the road ahead of a vehicle and detects luminances in the image. Then, based on the detected luminances, cruising lane markers on the road in the image are recognized.

In addition, the cruising lane recognition device includes a storing section that stores positions of the recognized cruising lane markers, and when a cruising lane marker cannot be recognized, sets a virtual cruising lane marker based on the positions of the cruising lane markers stored in the storing section.

The cruising lane recognition device can set the virtual cruising lane maker based on the cruising lane markers stored in the past even when the cruising lane marker cannot be recognized from the captured image. Therefore, even when the cruising lane marker cannot be recognized, a predetermined process (such as a process for judging the risk of cruising lane deviation) can be performed using the virtual cruising lane marker.

The cruising lane recognition device includes, for example, a tunnel detecting means for detecting that the vehicle is inside a tunnel, and can set the virtual cruising lane marker under a condition that the vehicle is detected to be inside a tunnel by the tunnel detecting means.

Although a cruising lane marker inside a tunnel has low contrast, and a cruising lane marker often cannot be recognized from the image captured by a camera or the like due to sudden changes in brightness accompanying entry into and exit from the tunnel, according to the cruising lane recognition device, the virtual cruising lane marker can be set even inside a tunnel, and various processes (such as judgment of the risk of cruising lane deviation) can be performed using the virtual cruising lane marker.

In addition, because there is little branching/merging of roads and changes in cruising lane width inside a tunnel, even when the virtual cruising lane marker is set based on the cruising lane markers stored in the past, the virtual cruising lane marker does not significantly diverge from the cruising lane marker that is actually present.

The cruising lane recognition device can be made not to set a virtual cruising lane marker, for example, in an instance in which the vehicle is not inside a tunnel, or an instance in which it is unclear if the vehicle is inside a tunnel.

For example, when one cruising lane marker on the road is recognized, the cruising lane recognition device can set a virtual cruising lane marker at a position separated by a space I between the pair of cruising lane markers (cruising lane markers on both left and right sides of the road) stored in the storing section, from the recognized cruising lane marker. In addition, for example, when the cruising lane markers on both sides of the road cannot be recognized, the cruising lane recognition device can set a pair of virtual cruising lane markers with an interval therebetween that is the space I between the pair of cruising lane markers stored in the storing section. As a result, the cruising lane recognition device can appropriately set the virtual cruising lane marker in both in an instance in which a cruising lane marker on either of the left and right sides of the road is recognized and an instance in which the cruising lane markers on both sides of the road are not recognized.

When the cruising lane markers on both sides of the road cannot be recognized and the pair of virtual cruising lane markers are set, the positions of the pair of virtual cruising lane markers can be, for example, the same as the positions of the pair of cruising lane markers stored in the storing section.

In addition, the cruising lane recognition device can, for example, include a movement amount detecting means for detecting a movement amount in a left/right direction of the vehicle. Then, when the cruising lane markers on both sides of the road cannot be recognized and the pair of virtual cruising lane markers are set, the set positions of the pair of virtual cruising lane markers can be adjusted based on the movement amount in the left/right direction of the vehicle detected by the movement amount detecting means.

In this instance, because the set positions of the pair of virtual cruising lane markers are adjusted based on the movement amount in the left/right direction of the vehicle, the virtual cruising lane markers can be set with even more accuracy (closer to the actual cruising lane markers) based on the position of the vehicle after movement.

The above-described cruising lane markers may be, for example, lines configured by paint, such as a white lane-marker or a colored lane-marker composed of a solid line or a broken line, raised markers intermittently disposed along the traveling direction of the vehicle.

The storing section may be, for example that which stores images of the recognized cruising lanes, or that which stores characteristics of the recognized images (such as positions and shapes) as numeric values.

EMBODIMENT FOR CARRYING OUT THE INVENTION

An embodiment of the present invention will hereinafter be described with reference to the drawings.

An example of a cruising lane recognition device of the present invention will hereinafter be described with reference to the accompanying drawings. First, a configuration of a cruising lane recognition device 1 will be described with reference to FIG. 1 and FIG. 2. The cruising lane recognition device 1 is mounted in a vehicle. Hereafter, the vehicle in which the cruising lane recognition device 1 is mounted is simply referred to as "the vehicle". The cruising lane recognition device 1 includes an image sensor 3, a yaw sensor (detection of movement amount in a turning direction of the vehicle) 5, a speed sensor (detection of movement amount in a traveling direction of the vehicle) 7, and a navigation system 9 (equivalent to a "second tunnel detecting means" in the scope of claims).

Figure 1:
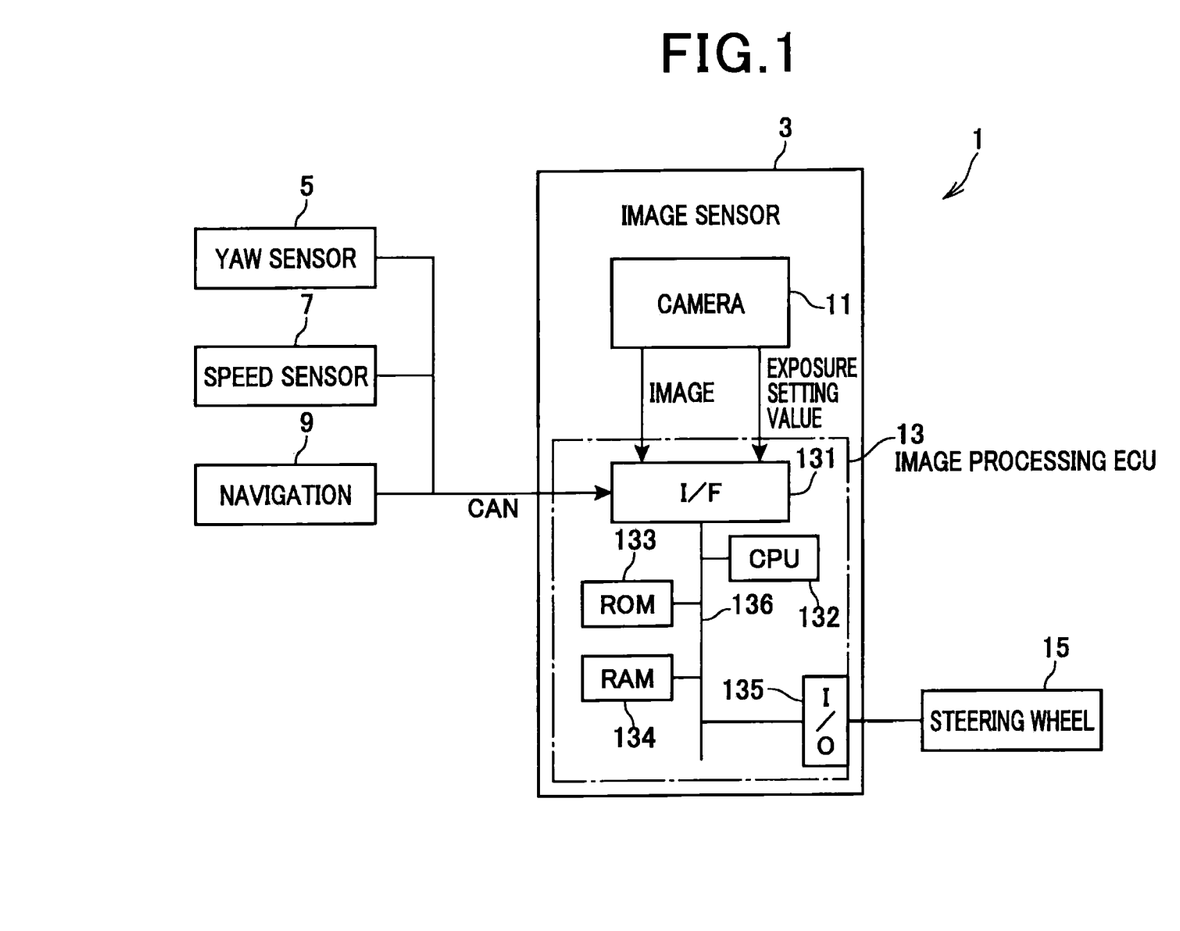
FIG. 1 a block diagram showing a configuration of a cruising lane recognition device 1.

The above-described image sensor 3 includes a camera (imaging means) 11 and an image processing engine control unit (referred to, hereinafter, as an "image processing ECU") 13. The camera 11 is a charge-coupled device (CCD) camera, and is provided in a position allowing an image ahead of the vehicle to be captured. The area of the image captured by the camera 11 is an area including the road ahead of the vehicle. The camera 11 outputs image data of the captured image to the image processing ECU 13. In addition, the camera 11 provides a function for automatically optimally adjusting exposure based on the brightness outside of the vehicle. The camera 11 outputs an exposure setting value (in other words, data reflecting the brightness outside of the vehicle) to the image processing ECU 13.

Figure 2:
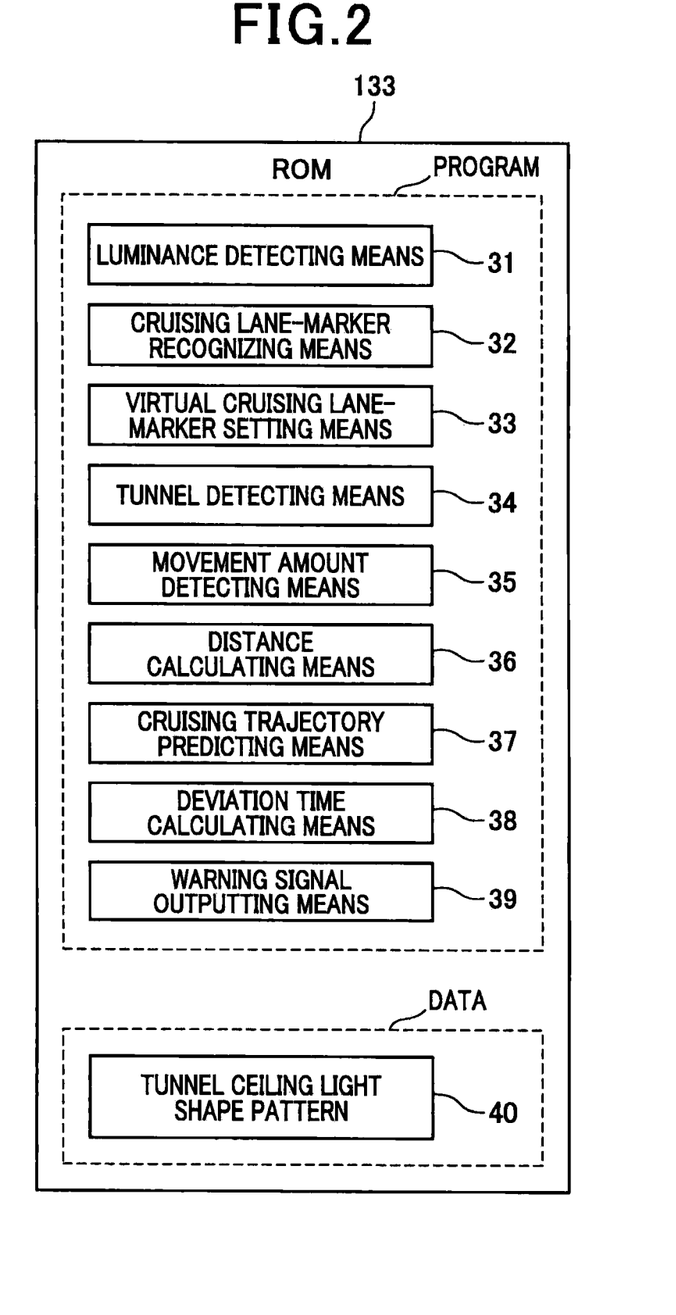
FIG. 2 a diagram showing programs and data stored in a read-only memory (ROM)

The image processing ECU 13 is configured by a microcomputer or the like and, for example, includes an interface (I/F) (131), a central processing unit (CPU) 132, a read-only memory (ROM) 133, a random access memory (RAM) 134, an input and output (I/O) (135), and a bus 136 that connects the foregoing. The ROM 133 stores in advance therein a luminance detecting means 31, a cruising lane marker recognizing means 32, a virtual cruising lane marker setting means 33, a tunnel detecting means (equivalent to the "second tunnel detecting means" in the scope of claims 34, a movement amount detecting means 35, a distance calculating means 36, a cruising trajectory predicting means 37, a deviation time calculating means 38, and a warning signal outputting means 39 that are computer programs used for the CPU 132 to perform processes, and a shape pattern (data) of ceiling lights inside a tunnel. The programs and data will become clear by the descriptions hereafter. The RAM 134 temporarily stores therein, for a predetermined amount of time, data captured momentarily by the camera 11 (equivalent to a "storing section" in the scope of claims).

The image processing ECU 13 performs a process described hereafter based on the image data and the exposure setting value inputted from the camera 11, and the data inputted via a control area network (CAN) from the yaw sensor 5, the speed sensor 7, the navigation system 9, and the like. In addition, when judged that there is risk of the vehicle deviating from the cruising lane based on the positions of the cruising lane markers recognized based on the process, the image processing ECU 13 outputs a deviation warning signal to a steering wheel 15 of the vehicle. When the deviation warning signal is inputted, the steering wheel 15 vibrates by a vibration mechanism, not shown, and notifies the driver of the vehicle of the risk of cruising lane deviation.

The above-described yaw sensor 5 detects an angular speed (in other words, a yaw rate) in the turning direction of the vehicle and outputs the detection value to the image processing ECU 13. The above-described speed sensor 7 detects the speed of the vehicle and outputs the detection value to the image processing ECU 13.

The above-described navigation system 9 acquires the position of the vehicle by a global positioning system (GPS) function. In addition, the navigation system 9 holds map data (that allows the positions of tunnels to be identified). The navigation system 9 judges whether or not the vehicle is inside a tunnel by collating the position of the vehicle acquired by the GPS function and the map data. When judged that the vehicle is inside a tunnel, the navigation system 9 outputs a signal of this fact to the image processing ECU 13.

2. Processes Performed by the Cruising Lane Recognition Device 1.

Figure 3:
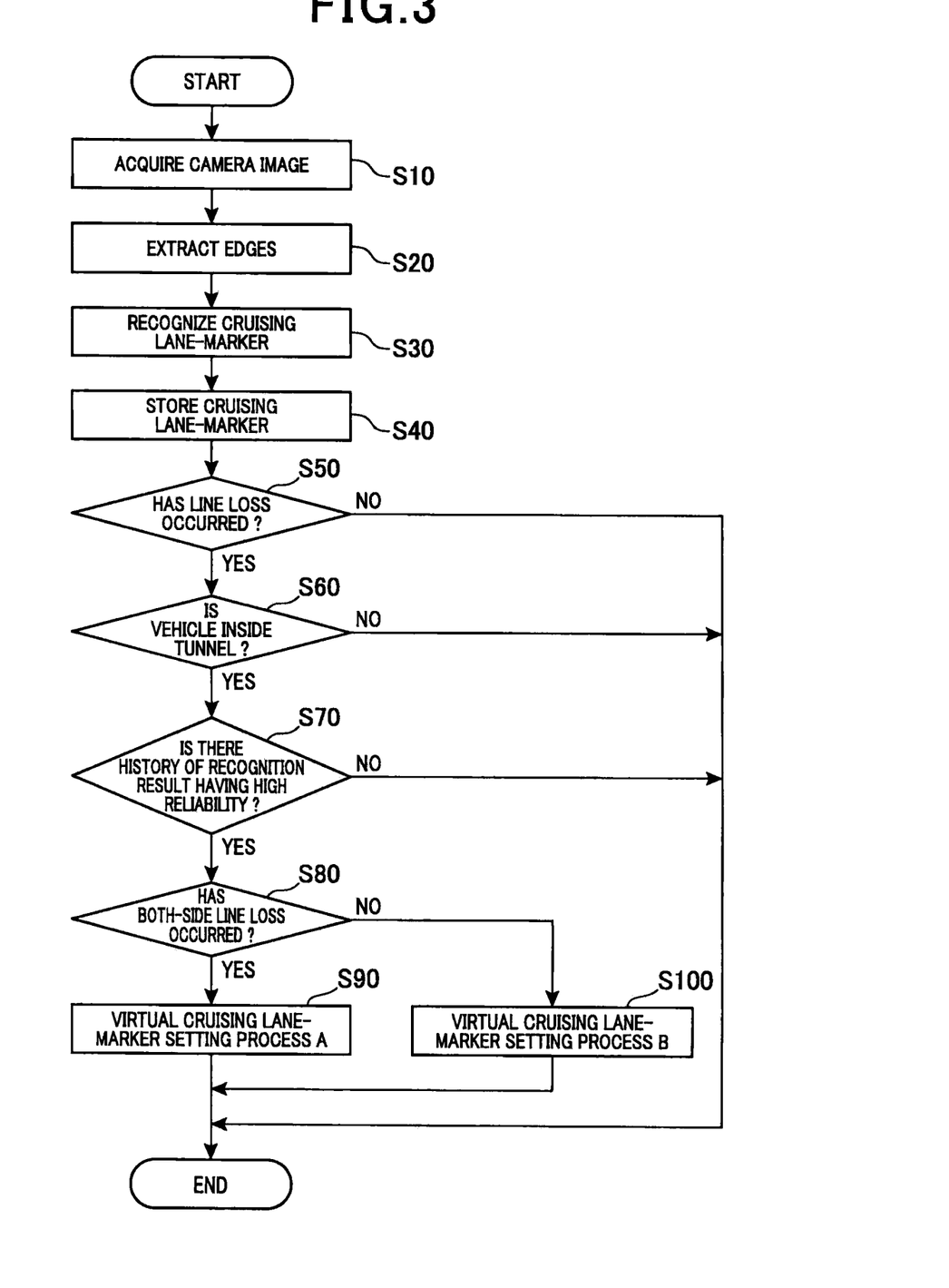
FIG. 3 a flowchart showing a process repeatedly performed by the cruising lane recognition device 1 every predetermined amount of time in a first example.

Processes performed by the cruising lane recognition device 1 will hereinafter be described with reference to FIG. 3 to FIG. 6. FIG. 3 is a flowchart showing a process repeatedly performed by the CPU 132 of the cruising lane recognition device 1 every predetermined amount of time.

Figure 4:
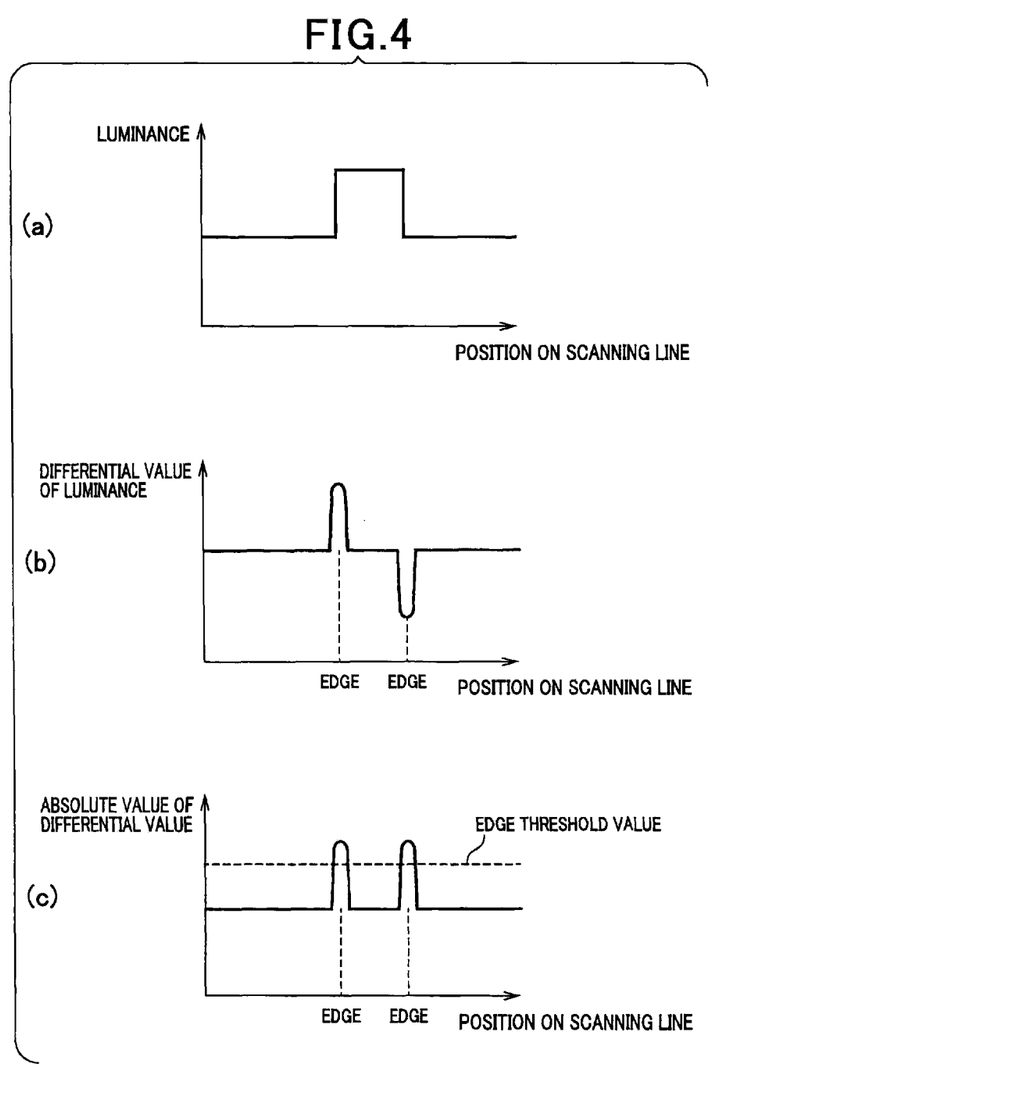
FIG. 4 an explanatory diagram showing an edge extraction process.
Figure 5:
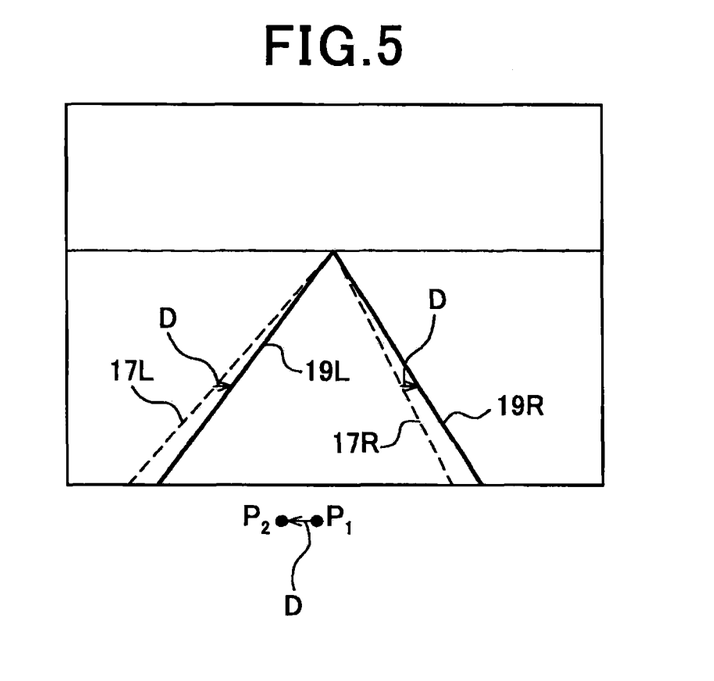
FIG. 5 an explanatory diagram showing a virtual cruising lane-marker setting process (for left and right cruising lane-markers lost)
Figure 6:
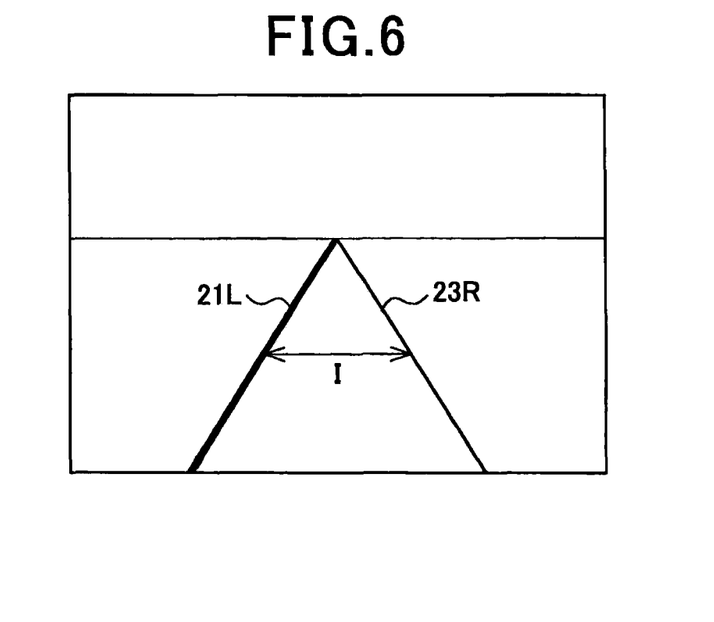
FIG. 6 an explanatory diagram showing a virtual cruising lane-marker setting process (for one-side cruising lane-marker lost)

FIG. 4 is an explanatory diagram showing edge extraction, described hereafter, and FIG. 5 and FIG. 6 are explanatory diagrams of a virtual cruising lane marker setting process, described hereafter.

At step S10 in FIG. 3, the camera 11 captures an image ahead of the vehicle and loads the image data into the image processing ECU 13. The area of the captured image is the area including the road surface ahead of the vehicle.

At step S20, the edges of a cruising lane marker on the road are extracted based on the image data captured at step S10. Specifically, the following is performed. Within the image data captured at step S10, a scanning line in a horizontal direction (direction perpendicular to the traveling direction of the vehicle) is set in an area in which the road surface is present (hereinafter, road surface imaging area), and a differential curve of the luminance of pixels positioned on the scanning line is calculated. For example, when the luminance of the pixels positioned on the scanning line is as shown in (a) of FIG. 4, the differential curves of luminance shown in (b) of FIG. 4 are obtained. Furthermore, absolute values of the differential values are obtained as shown in (c) of FIG. 4.

The area in which the luminance is high in (a) of FIG. 4 is a single cruising lane marker (one of either the left or right cruising lane marker) on the road, and the other areas are the rest (i.e. the portion excluding the cruising lane marker portion) of the road. As shown in (c) of FIG. 4, a predetermined threshold value is applied to the curves expressing the absolute values of the differential values, and the intersection thereof is determined. The positions of the two intersections on the scanning line are extracted as the edges of a single cruising lane.

The above-described process is performed for each of a plurality of scanning lines that are set with a predetermined distance therebetween in the traveling direction. As a result, ordinarily, a total of four edges related to the left cruising lane marker and the right cruising lane marker are extracted along the traveling direction of the vehicle.

At step S30, a pair of straight lines that pass through the plurality of edges along the traveling direction, extracted at step S20, are calculated by fitting. The pair of straight lines are equivalent to boundaries between a single cruising lane and the rest of the road. Therefore, the area sandwiched between the pair of straight lines is recognized as a single cruising lane. Because the cruising lane marker is ordinarily present on both left and right sides of the road, the cruising lane markers on both left and right sides of the road are ordinarily recognized at step S30.

At step S40, the shape (straight line or curved line) and the position of the cruising lane marker recognized at step S30 are stored in the RAM 134 (storing section). The position of the cruising lane marker herein refers to the position within the image captured by the camera 11 (in other words, the position with reference to the vehicle).

At step S50, a judgment is made regarding whether or not a situation in which at least a cruising lane marker on one side, of both left and right sides of the road, cannot be recognized (referred to, hereinafter, as "line loss") has occurred at step S30. When line loss has occurred, the process proceeds to step S60, and if line loss has not occurred, the present process is completed.

At step S60, a judgment is made regarding whether or not the vehicle is inside a tunnel. Specifically, the vehicle is judged to be inside a tunnel when even one of the following conditions (A) to (C) is established, and judged to be outside a tunnel when none of the conditions is established.

(A) The exposure setting value sent from the camera 11 (in other words, data reflecting the brightness outside of the vehicle) suddenly changes from a value corresponding to a bright state to a value corresponding to a dark state, and the value corresponding to the dark state subsequently continues.

(B) A signal stating that the vehicle is inside a tunnel is received from the navigation system 9.

(C) The shape of the ceiling lights inside a tunnel is recognized from within the image captured by the camera 11. The ROM 133 of the image processing ECU 13 holds in advance therein the shape pattern of ceiling lights inside a tunnel, and a judgment is made by image recognition regarding whether or not the shape pattern is present within the image captured by the camera 11.

Among the above-described conditions (A) to (C), if even one condition is established and the vehicle is judged to be inside a tunnel, the process proceeds to step S70, and when the vehicle is judged not to be inside a tunnel, the present process is completed.

At step S70, a judgment is made regarding whether or not a recognition result having high reliability is present among recognition results stored in the RAM 134 that is the storing section. Specifically, when the elapsed time from the point at which storing is performed at step S40 to the point of the present step S70 is within a predetermined amount of time and line loss has not occurred in the stored cruising lane markers, a judgment is made that a recognition result (stored cruising lane marker) having high reliability is present. On the other hand, when a recognition result stored within the predetermined amount of time is not present or when, although a recognition result stored within the predetermined amount of time is present, the recognition result includes line loss, a judgment is made that a recognition result having high reliability is not present.

When a recognition result having high reliability is present, the process proceeds to step S80, and when a recognition result having high reliability is not present, the present process is completed.

At step S80, a judgment is made regarding whether the cruising lane markers on both left and right sides of the road cannot be recognized or only a cruising lane marker on either of the left and right sides of the road cannot be recognized. When the cruising lane markers on both left and right sides cannot be recognized, the process proceeds to step S90, and when a cruising lane marker on either of the left and right sides can be recognized, the process proceeds to step S100.

(Virtual Cruising Lane Marker Setting for Both-Side Line Loss)

At step S90, a virtual cruising lane marker setting process A is performed. The virtual cruising lane marker setting process A will be described with reference to FIG. 5. First, among the cruising lane markers stored at above-described step S40, the cruising lane markers that have no line loss and are most recently stored are read out. FIG. 5 shows cruising lane markers 17L and 17R that have been read out. The cruising lane marker 17L is a cruising lane marker on the left side of the road and 17R is a cruising lane marker on the right side of the road.

Next, a movement amount D in a left/right direction of the vehicle (direction perpendicular to the traveling direction of the vehicle) from the point at which the cruising lane markers 17L and 17R are stored to the point of the present step S90 is calculated. The movement amount D is calculated from the yaw rate detected by the yaw sensor 5 and the speed detected by the speed sensor 7. FIG. 5 shows a position $P_1$ in the left/right direction of the vehicle at the point at which the cruising lane markers 17L and 17R are stored, and a position $P_2$ in the left/right direction of the vehicle at the point at which the present step S90 is performed. The distance between $P_1$ and $P_2$ is the movement amount D.

Next, the cruising lane markers 17L and 17R are moved in the direction opposite to the movement direction of the vehicle (direction from $P_1$ to $P_2$) by an amount equivalent to the movement amount D. A cruising lane marker obtained by the cruising lane marker 17L being moved is a virtual cruising lane marker 19L, and a cruising lane marker obtained by the cruising lane marker 17R being moved is a virtual cruising lane marker 19R.

A space I between the virtual cruising lane markers 19L and 19R is the same as a space I between the cruising lane markers 17L and 17R. In addition, the shape of the virtual cruising lane marker 19L (straight line or curved line) is the same as the shape of the cruising lane marker 17L, and the shape of the virtual cruising lane marker 19R (straight line or curved line) is the same as the shape of the cruising lane marker 17R.

(Virtual Cruising Lane Marker Setting for One-Side Line Loss)

At step S100, a virtual cruising lane marker setting process B is performed. The virtual cruising lane marker setting process B will be described with reference to FIG. 6. Here, as shown in FIG. 6, an example is described in which, although a cruising lane marker 21L on the left side of the road is recognized at above-described step S30, the cruising lane marker on the right side of the road cannot be recognized. First, among the cruising lane markers stored at above-described step S40, the cruising lane markers that have no line loss and are most recently stored are read out. The space I between the cruising lane marker on the left side of the road and the cruising lane marker on the right side in the cruising lane markers that have been read out is calculated.

Next, as shown in FIG. 6, a virtual cruising lane marker 23R is set in a position on the right side of the cruising lane marker 21L that is separated by the space I. The cruising lane marker 21L and the virtual cruising lane marker 23R are parallel, and the space therebetween is I at any location. In addition, the shape of the virtual cruising lane marker 23R is the same as the shape of the cruising lane marker 21L. For example, if the cruising lane marker 21L is a straight line, the virtual cruising lane marker 23R is also a straight line. In addition, if the cruising lane marker 21L is a curved line, the virtual cruising lane marker 23R is also a curved line that curves with the same radius of curvature and in the same direction.

Contrary to the example in FIG. 6, in an instance in which the cruising lane marker on the right side of the road is recognized but the cruising lane on the left side of the road cannot be recognized, in a manner similar to that above, a virtual cruising lane marker (cruising lane marker on the left side of the road) is set on the left side of the cruising lane that has been recognized such as to be separated by the space I.

The cruising lane recognition device 1 performs the following process using the cruising lane marker that has been recognized, or the virtual cruising lane marker that has been set, as described above. First, a distance X from the vehicle to the recognized cruising lane marker or the set virtual cruising lane marker is calculated. The distance X is the distance from the vehicle to the recognized cruising lane marker when the cruising lane marker is recognized, and is the distance from the vehicle to the virtual cruising lane marker corresponding with the cruising lane marker that could not be recognized when the cruising lane marker is not recognized.

Next, based on the yaw rate obtained from the yaw sensor 5 and the vehicle speed obtained from the speed sensor 7, a cruising trajectory of the vehicle is predicted. Furthermore, based on the above-described distance X and the predicted cruising trajectory of the vehicle, an amount of time required for the vehicle to deviate from the cruising lane (recognized cruising lane marker or set virtual cruising lane marker) is calculated. Then, when the calculated amount of time is less than a predetermined threshold value, a judgment is made that there is risk of deviation, and a deviation warning signal is outputted to the steering wheel 15.

3. Effects Achieved by the Cruising Lane Recognition Device 1

(1) The cruising lane recognition device 1 can set a virtual cruising lane marker based the cruising lane markers stored in the past, even when a cruising lane cannot be recognized from the image captured by the camera 11. Therefore, even when a cruising lane marker cannot be recognized, the risk of cruising lane deviation can be judged using the virtual cruising lane marker.

(2) The cruising lane recognition device 1 sets the virtual cruising lane marker under a condition that the vehicle is inside a tunnel. Although a cruising lane marker inside a tunnel has low contrast, and a cruising lane marker often cannot be recognized from the image captured by the camera 11 due to sudden changes in brightness accompanying entry into and exit from the tunnel, according to the cruising lane recognition device 1, the virtual cruising lane marker can be set even inside a tunnel, and the risk of cruising lane deviation can be judged using the virtual cruising lane marker.

In addition, because there is little branching/merging of roads and changes in cruising lane width inside a tunnel, even when the virtual cruising lane marker is set based on the cruising lane markers stored as history, the virtual cruising lane marker does not significantly diverge from the cruising lane marker that is actually present.

(3) The cruising lane recognition device 1 can appropriately set the virtual cruising lane marker in both in an instance in which a cruising lane marker on either of the left and right sides of the road is recognized and an instance in which the cruising lane markers on both sides of the road are not recognized.

In addition, when the pair of virtual cruising lane markers on both sides of the road are set, because the set positions of the pair of virtual cruising lane markers are adjusted based on the movement amount in the left/right direction of the vehicle, the virtual cruising lane markers can be even more accurately set depending on the position of the vehicle after movement.

4. Example (1) Processes Performed by the Cruising Lane Recognition Device 1

Figure 7:
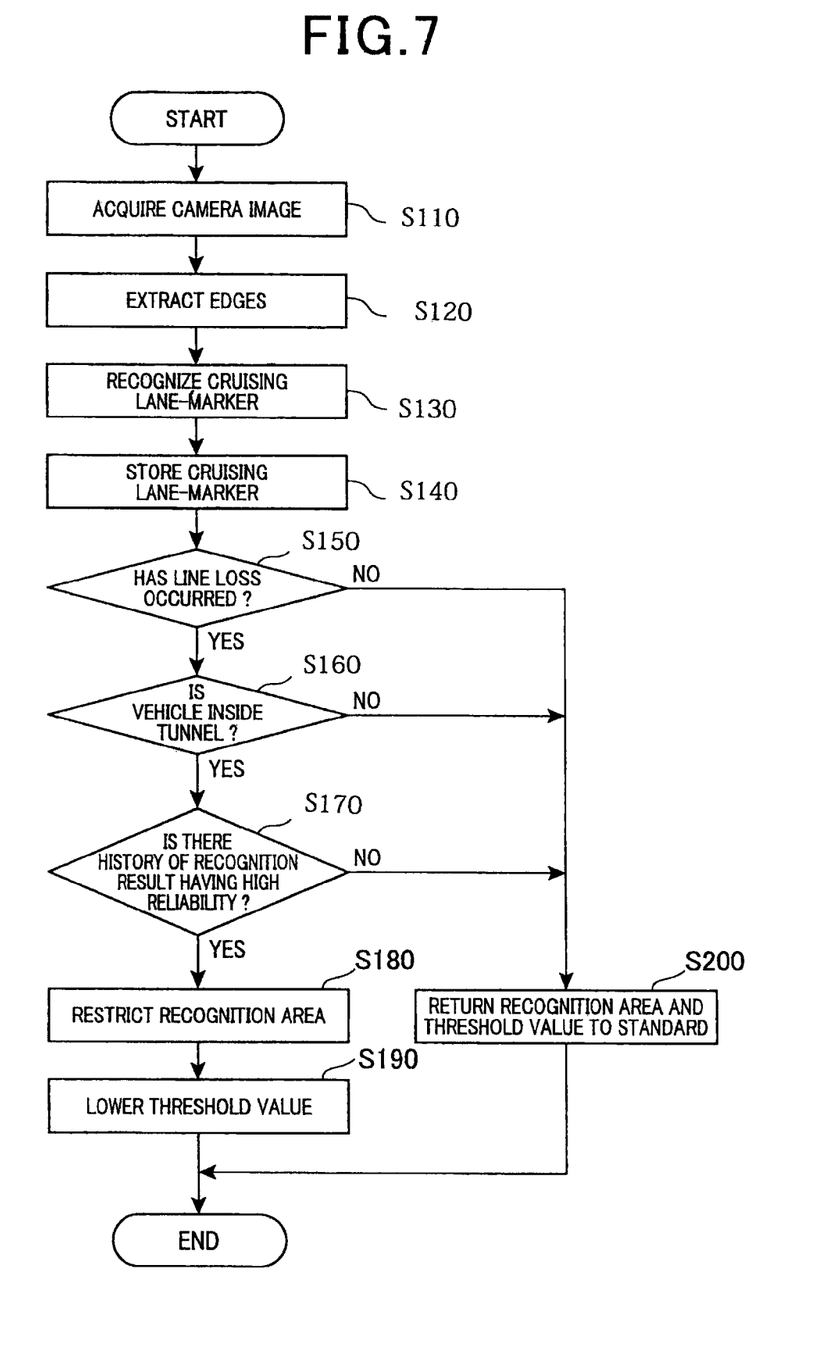
FIG. 7 a flowchart showing a process repeatedly performed by the cruising lane recognition device 1 every predetermined amount of time in a second example.

The cruising lane recognition device 1 may repeatedly perform a process shown in the flowchart in FIG. 7 every predetermined amount of time. At step S110 in FIG. 7, the camera 11 captures an image ahead of the vehicle and loads the image data into the image processing ECU 13. The area of the captured image is the area including the road ahead of the vehicle.

At step S120, in a manner similar to that at above-described step S20, the edges of the cruising lane markers in the image data related to the left cruising lane marker and the right cruising lane marker on the road are extracted. However, in an instance in which a recognition area $L_1$ (left cruising lane marker edge extraction area) and a recognition area $L_2$ (right cruising lane marker edge extraction area) are each restrictively set at step S180, described hereafter, the edges are extracted from these areas. In addition, in an instance in which a threshold value $S_1$ that is lower than ordinary is set at step S190, described hereafter, the edges are extracted using the threshold value $S_1$.

At step S130, straight lines passing through the plurality of edges extracted at step S120 are calculated by fitting. The straight lines are equivalent to the boundaries on both sides of the cruising lane. The area sandwiched between the pair of straight line is recognized as a single cruising lane.

At step S140, the shape (straight line or curved line) and position of the cruising lane marker recognized at step S130 are stored in the RAM of the image processing ECU 13.

At step S150, a judgment is made regarding whether or not a situation in which at least a cruising lane marker on one side, of both left and right sides of the road, cannot be recognized (line loss) has occurred at above-described step S130. When line loss has occurred, the process proceeds to step S160, and if line loss has not occurred, the process proceeds to step S200.

At step S160, in a manner similar to that at above-described step S60, a judgment is made regarding whether or not the vehicle is inside a tunnel. When the vehicle is judged to be inside a tunnel, the process proceeds to step S170, and when the vehicle is judged not to be inside a tunnel, the process proceeds to step S200.

At step S170, a judgment is made regarding whether or not a recognition result having high reliability is present among recognition results stored at above-described step S140. Specifically, when the elapsed time from the point at which storing is performed at step S40 to the point of the present step S170 is within a predetermined amount of time and line loss has not occurred in the stored cruising lane markers, a judgment is made that a recognition result (stored cruising lane markers) having high reliability is present. On the other hand, when a recognition result stored within the predetermined amount of time is not present or when, although a recognition result stored within the predetermined amount of time is present, the recognition result includes line loss, a judgment is made that a recognition result having high reliability is not present. When a recognition result having high reliability is present, the process proceeds to Step 180, and when a recognition result having high reliability is not present, the process proceeds to Step 200.

Figure 8:
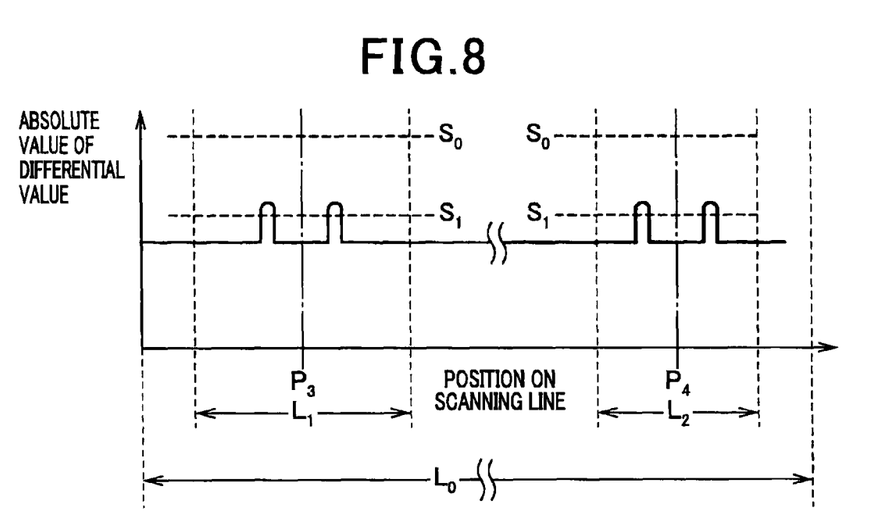
FIG. 8 an explanatory diagram showing a process for setting a recognition area and a threshold value in the second example.

At step S180, a process is performed to restrict the area in which edge extraction is performed at above-described step S120 (hereinafter, recognition area). The process will be described with reference to FIG. 8. A horizontal axis in FIG. 8 is the position on a scanning line used for edge extraction, and a vertical axis is the absolute value of the differential value of luminance of the pixels (refer to above-described step S20 and step S120).

(Virtual Cruising Lane Marker Setting for Both-Side Line Loss)

For example, an example is given of an instance in which the cruising lane markers on both left and right sides of the road cannot be recognized at above-described steps S120 and step S130. First, among the cruising lane markers stored at above-described step S140, the cruising lane markers that have no line loss and are most recently stored are read out. As shown in FIG. 8, on the cruising lane that has been read out, a center position of the left-side cruising lane marker is $P_3$ and a center position of the right-side cruising lane marker is $P_4$. The center positions $P_3$ and $P_4$ may be decided taking into consideration the movement amount D in the left/right direction of the vehicle (direction perpendicular to the traveling direction of the vehicle) from the point at which the cruising lane markers that have been read out are stored to the point of the present step S180. For example, when the vehicle is moving to the left by the movement amount D, the center positions $P_3$ and $P_4$ can be moved to the right side by an amount equivalent to the movement amount D.

Then, on the scanning line, a predetermined area with the center position $P_3$ at the center is set as a recognition area $L_1$, and a predetermined area with the center position $P_4$ at the center is set as a recognition area $L_2$. When the edge extraction at step S120 is performed in a state in which the recognition areas $L_1$ and $L_2$ are set, the edge extraction is performed only within the recognition areas $L_1$ and $L_2$. In a state in which the recognition areas $L_1$ and $L_2$ are not set, edge extraction is performed within an ordinary recognition area $L_0$ that is wider than the recognition areas $L_1$ and $L_2$.

(Virtual Cruising Lane Marker Setting for One-Side Line Loss)

In addition, when only the cruising lane marker on the left side, of the cruising lane markers on both left and right sides of the road, cannot be recognized at above-described steps S120 and step S130, the center position $P_3$ is set, and the predetermined area with the center position $P_3$ at the center is the recognition area $L_1$. The center position $P_3$ may be the center position of the left-side cruising lane marker that has been read out, or may be a position moved to the left by an amount equivalent to the space I (space between the left-side cruising lane marker and the right-side cruising lane marker that have been read out) from the right-side cruising lane marker that has been recognized. On the other hand, the recognition area $L_2$ is not set. When the edge extraction at above-described step S120 is performed in this state, in the region on the left half of the road, the edge extraction is performed only within the recognition area $L_1$. In the region on the right half of the road, the edge extraction is performed within the ordinary recognition area $L_0$.

In addition, when only the cruising lane marker on the right side, of the cruising lane markers on both left and right sides of the road, cannot be recognized at above-described step S120 and step S130, the center position $P_4$ is set, and the predetermined area with the center position $P_4$ at the center is the recognition area $L_2$. The center position $P_4$ may be the center position of the right-side cruising lane marker that has been read out, or may be a position moved to the right by an amount equivalent to the space I (space between the left-side cruising lane marker and the right-side cruising lane marker that have been read out) from the left-side cruising lane marker that has been recognized. On the other hand, the recognition area $L_1$ is not set. When the edge extraction at above-described step S120 is performed in this state, in the region on the right half of the road, the edge extraction is performed only within the recognition area $L_2$. In the region on the left half of the road, the edge extraction is performed within the ordinary recognition area $L_0$.

As described above, when the cruising lane marker cannot be recognized, at step S180, the area in which edge extraction of the cruising lane marker (cruising lane marker recognition) is performed is restricted to be narrower than the ordinary area based on the positions of the cruising lane markers recognized and stored in the past.

At step S190, the threshold value used for edge extraction is lowered. In other words, when the recognition area $L_1$ or $L_2$ is set and the edge extraction is performed only within the area, the threshold value is lowered from the ordinary threshold value $S_0$ to a threshold value $S_1$ that is lower than the threshold value $S_0$. Regarding cruising lane markers for which the recognition areas $L_1$ and $L_2$ are not set, the ordinary threshold value $S_0$ is used.

On the other hand, when judged NO at step S150, step S160, and step S170, the process proceeds to step S200. At step S200, if the recognition areas $L_1$ and $L_2$ are set, they are cancelled and the ordinary recognition area $L_0$ is set. In addition, if the threshold value $S_1$ is set, this is canceled, and the ordinary threshold value $S_0$ is set. In addition, if the recognition areas $L_1$ and $L_2$ and the threshold value $S_1$ are not set, no particular process is performed. After step S200 is performed, the present process is completed.

(2) Effects Achieved by the Cruising Lane Recognition Device 1 in the Example

When a cruising lane marker cannot be recognized, the cruising lane recognition device 1 lowers the threshold value used to recognize the cruising lane marker. Therefore, even when the cruising lane marker inside a tunnel has low contrast, and the cruising lane marker is difficult to recognize due to sudden changes in brightness accompanying entry into and exit from the tunnel, the cruising lane marker can be recognized.

In addition, because the cruising lane recognition device 1 restricts the recognition area of the edges to an area in which the possibility of the cruising lane marker being present is high when lowering the threshold value, noise is less likely to be picked up even when the threshold value is low. In addition, because the cruising lane recognition device 1 sets the recognition areas $L_1$ and $L_2$ based on the positions of the cruising lane markers recognized and stored in the past, the recognition areas $L_1$ and $L_2$ can be appropriately set to cover an area in which the possibility of the actual cruising lane marker being present is high.

In addition, the cruising lane recognition device 1 sets the recognition areas $L_1$ and $L_2$ under a condition that the vehicle is inside a tunnel. Because there is little branching/merging of roads and changes in cruising lane width inside a tunnel, even when the recognition areas $L_1$ and $L_2$ are set based on the cruising lane markers stored past, the cruising lane marker that is actually present is not outside of the recognition areas $L_1$ and $L_2$.

The present invention is not limited in any to the above-described embodiment, and various embodiments are possible within a scope that does not depart from the present invention.

EXPLANATION OF REFERENCE NUMBERS

1: cruising lane recognition device
3: image sensor
5: yaw sensor
7: speed sensor
9: navigation system
11: camera
13: image processing ECU
15: handle
17L, 17R, 21L: cruising lane marker
19L, 19R, 23: virtual cruising lane marker
$L_0$: ordinary recognition area
$L_1$, $L_2$: recognition area
$P_1$, $P_2$: position
$P_3$, $P_4$: center position
$S_0$: ordinary threshold value
$S_1$: threshold value

The invention claimed is:

1. A cruising lane recognition device to be mounted on a vehicle comprising:
a camera which captures an image of an area including the road ahead of a vehicle;
a storing unit; and
a processor, the processor being configured to:
detect luminances within the images;
recognize a cruising lane-marker of the road in the photographic images on the basis of the luminances which are detected;
store, in the storing unit, a position of the cruising lane that is recognized;
detect that the vehicle is in a tunnel; and
set a virtual cruising lane-marker on the basis of an archival record of the position of a cruising lane-marker which has been stored in the storing unit when the cruising lane-marker cannot be recognized and when the vehicle has been detected to exist in the tunnel;
the cruising lane recognition device further comprising at least one of:
a navigation system mounted on the vehicle, wherein the navigation system determines that the vehicle is in the tunnel based on map information therein and a present position of the vehicle; and
an image processing engine control unit, wherein the image processing engine control unit determines that the vehicle is in the tunnel based on geometry patterns of a ceiling of the tunnel which are stored in advance.

2. The cruising lane recognition device according to claim 1, wherein the processor is provided in an image processing engine control unit.

3. The cruising lane recognition device according to claim 1, wherein in a case where only one of a left side cruising lane-marker or a right side cruising lane-marker is recognized, the processer is further configured to set virtually a non-recognized cruising lane-marker at a position that is a certain interval from the recognized cruising lane-marker, where the certain interval is an interval between the left cruising lane-marker and the right cruising lane-marker that is stored.

4. The cruising lane recognition device according to claim 1, wherein in a case where both of the left side cruising lane-marker and the right side cruising lane-marker are not recognized, the processer is further configured to set virtually a pair of the left side cruising lane-marker and the right side cruising lane-marker such that the set pair of cruising lane-markers straddle the vehicle, so as to have the left side cruising lane-marker and the right side cruising lane-marker by a certain distance.

5. A cruising lane recognition device to be mounted on a vehicle comprising:
a camera which captures an image of an area including the road ahead of a vehicle;
a storing unit; and
a processor, the processor being configured to:
detect luminances within the images;
recognize a cruising lane-marker of the road in the photographic images on the basis of the luminances which are detected;
store, in the storing unit, a position of the cruising lane that is recognized;
detect that the vehicle is in a tunnel; and set a virtual cruising lane-marker on the basis of an archival record of the position of a cruising lane-marker which has been stored in the storing unit when the cruising lane-marker cannot be recognized and when the vehicle has been detected to exist in the tunnel, wherein in a case where both of the left side cruising lane-marker and the right side cruising lane-marker are not recognized, the processer is further configured to set virtually a pair of the left side cruising lane-marker and the right side cruising lane-marker such that the set pair of cruising lane-markers straddle the vehicle, so as to have the left side cruising lane-marker and the right side cruising lane-marker by a certain distance.

6. The cruising lane recognition device according to claim 5, wherein the processer is further configured to:

detect a movement amount of the vehicle in a horizontal direction; and adjust a set position of the pair of virtual cruising lane-markers depending on the movement amount, which is detected by the processor of the vehicle in the horizontal direction.

7. The cruising lane recognition device according to claim 6, further comprising:

a yaw sensor which detects a movement amount (a yaw rate) of the vehicle in a yawing direction; and a vehicle speed sensor, wherein the movement amount of the vehicle is calculated by the yaw rate detected by the yaw sensor and the vehicle speed detected by the vehicle speed sensor.

8. The cruising lane recognition device according to claim 7, wherein the processer is further configured to:

calculate a distance in a horizontal direction from the vehicle to the recognized cruising lane-marker or the set virtual cruising lane-marker;

predict a vehicular cruising trajectory on the basis of the yaw rate which is acquired by the yaw sensor and the vehicle speed which is acquired by the vehicle speed sensor;

calculate a time required for the vehicle to depart from the cruising lane (the recognized cruising lane-marker or the set virtual cruising lane-marker) on the basis of the distance and the predicted vehicular cruising trajectory; and output a warning signal to an external device in a case where a calculated time is less than a predetermined threshold.

9. The cruising lane recognition device according to claim 8, wherein the external device is a steering wheel of the vehicle.

* * * * *

UNITED STATES PATENT AND TRADEMARK OFFICE
CERTIFICATE OF CORRECTION

PATENT NO. : 9,544,546 B2
APPLICATION NO. : 14/233095
DATED : January 10, 2017
INVENTOR(S) : Shunsuke Suzuki Page 1 of 1

It is certified that error appears in the above-identified patent and that said Letters Patent is hereby corrected as shown below:

On the Title Page

At Column 2, (57) Abstract, Line number 7, after "detected," delete "a".

Signed and Sealed this
Thirtieth Day of May, 2017

Michelle K. Lee
*Director of the United States Patent and Trademark Office*